United States Patent
Heutger et al.

(10) Patent No.: US 11,307,550 B2
(45) Date of Patent: Apr. 19, 2022

(54) SEQUENCE CONTROL OF PROGRAM MODULES

(71) Applicant: Phoenix Contact GmbH & Co. KG, Blomberg (DE)

(72) Inventors: Henning Heutger, Bad Pyrmont (DE); Rolf Kleinow, Bielefeld (DE); Andreas Weichelt, Kirchlengern (DE); Stefan Hausmann, Lemgo (DE); Jens Frieben, Paderborn (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 111 days.

(21) Appl. No.: 16/349,003

(22) PCT Filed: Nov. 10, 2017

(86) PCT No.: PCT/EP2017/078931
§ 371 (c)(1),
(2) Date: May 10, 2019

(87) PCT Pub. No.: WO2018/087314
PCT Pub. Date: May 17, 2018

(65) Prior Publication Data
US 2019/0286089 A1    Sep. 19, 2019

(30) Foreign Application Priority Data
Nov. 10, 2016   (LU) .......................................... 93299

(51) Int. Cl.
*G06F 9/46*   (2006.01)
*G05B 19/042*  (2006.01)
(Continued)

(52) U.S. Cl.
CPC ..... *G05B 19/0426* (2013.01); *G05B 19/4148* (2013.01); *G06F 9/445* (2013.01);
(Continued)

(58) Field of Classification Search
CPC ............ G05B 19/0426; G05B 19/4148; G05B 2219/25343; G05B 2219/32247;
(Continued)

(56) References Cited

U.S. PATENT DOCUMENTS 7,526,685 B2 * 4/2009 Noy ..................... G06F 11/3438
702/186
8,108,543 B2 * 1/2012 Hansen ................... H04L 67/42
709/232
(Continued)

FOREIGN PATENT DOCUMENTS

CN   101645009 A   2/2010
CN   103649919 A   3/2014
(Continued)

OTHER PUBLICATIONS

Authorized Officers: VOYe-Piccoli, Alexandra; Rakoczy, Tobias, International Search Report and Written Opinion issued in PCT application No. PCT/EP2017/078931, dated Jan. 10, 2018, 11 pp.
(Continued)

*Primary Examiner* — Wissam Rashid
(74) *Attorney, Agent, or Firm* — Kaplan Breyer Schwarz, LLP (57) ABSTRACT

A method for sequence control of program modules, includes providing a control means and a description file having a configuration for controlling a program sequence. The method further includes providing a plurality of program modules which can be executed by a real-time operating system, the program modules being created using one or different programming languages. The method furthermore includes initiating selected program modules by executing specifications in the description file using the control means.

15 Claims, 4 Drawing Sheets

(51) Int. Cl.
 *G06F 9/445* (2018.01)
 *G06F 9/48* (2006.01)
 *G05B 19/414* (2006.01)
(52) U.S. Cl.
 CPC .............. *G06F 9/48* (2013.01); *G06F 9/4843* (2013.01); *G05B 2219/25343* (2013.01); *G05B 2219/32247* (2013.01); *G05B 2219/34411* (2013.01); *Y02P 90/02* (2015.11)
(58) Field of Classification Search
 CPC ........... G05B 2219/34411; G06F 9/445; G06F 9/4843; Y02P 90/02
 See application file for complete search history.

(56) References Cited

U.S. PATENT DOCUMENTS

| | | | |
|---|---|---|---|
| 2008/0082312 A1* | 4/2008 | Dash | G05B 23/0262 703/25 |
| 2011/0029140 A1 | 2/2011 | Jordan et al. | |

FOREIGN PATENT DOCUMENTS

| | | |
|---|---|---|
| CN | 104503779 A | 4/2015 |
| CN | 106020008 A | 10/2016 |
| EP | 2504738 B1 | 10/2012 |
| EP | 3076297 A2 | 10/2016 |
| WO | 2009/037198 A1 | 3/2009 |
| WO | 2013/010159 A1 | 1/2013 |

OTHER PUBLICATIONS

Office Action issued in corresponding German patent application No. 102016121542.2, dated Jul. 13, 2017, 16 pp.
Thomas J. Burke, "OPC-Unified Architecture, Pioneer of the 4th industrial (Revolution", OPC Foundation, http://www.opcfoundation-events.com/uploads/media/OPC-UA-Wegbereiter-der-IE40-DE-v2.pdf, www.archive.org, Oct. 14, 2014, researched Jul. 12, 2017, 40 pp.
Tino Bohler, "Production, Technology and business for German industry, OPC-Unified Architecture, OPC-UA as pioneer for industry 4.0", dated Jun. 8, 2016, https://www.produktion.de/technik/it/opc-ua-als-wegbereiter-fuer-industrie-4-0-112.html, (researched Jul. 12, 2017), 4 pp.
Authorized Officer: Nora Lindner, English Translation of the International Preliminary Report on Patentability, May 23, 2019, 9 pp.
Office Action issued in counterpart Chinese patent application No. 201780069786.4, dated Jul. 28, 2021, 13 pp. w/ translation.

* cited by examiner

SEQUENCE CONTROL OF PROGRAM MODULES

FIELD

The present invention is in the field of automation engineering, in particular industrial automation engineering, and relates to a method for sequence control of program modules. The present invention further relates to a real-time operating system, a control unit, a controller, and a computer program product.

BACKGROUND

A shift is to be anticipated in automation engineering, from the use of conventional programming languages to the use of high-level languages.

Hitherto, for example, IEC Standard 61131 regulates the syntax and the semantics of programming languages for programmable controllers. In this case, a unified suite of programming languages for programmable controllers is proposed. This suite comprises two textual languages (Instruction List and Structured Text), and two graphical languages (Ladder Diagram and Function Block Diagram). Furthermore, IEC Standard 61131 defines features that simplify the communication between program controllers and further components of an automated system.

Current topics, such as Industry 4.0, the Internet of things, or the CPS Agenda of the VDI, indicate that automated facilities will in future be characterized by a large amount of networking and software. In the process, there will be a change from conventional IEC 61131-3 programming to modern high-level languages. By 2018, approximately 70% of the code used is intended to be outside the languages defied by the IEC. In the process, the existing requirements, such as real-time capability and consistency, are supplemented by greater flexibility, higher security, and improved serviceability.

There will consequently also be technical changes, in the future, in the production of programmable logic controllers and/or runtime environments.

EP 2 504 738 B1 describes a control method and a method for running a plurality of programs on a plurality of processing means that operate in parallel. In this case, a time signal generator is assigned to each of the plurality of processing means operating in parallel, a control method for running programs being performed when said signal generator is executed on the associated processing means.

The use of a time signal generator is disadvantageous, however, in that the speed of processing data in a real-time operating system may be reduced.

Summary

An object of the present invention is that of specifying a solution for improving sequence control of real-time operating systems.

This object is achieved according to the invention by the features of claim 1. The object is furthermore achieved by a real-time operating system according to claim 13, a control means according to claim 14, a controller according to claim 15, and a computer program product according to claim 16. Further embodiments can be found in the dependent claims.

According to the method according to the invention for sequence control of program modules, a control means is provided, and a description file comprising configuration of the description file for controlling a program sequence is provided. The method furthermore comprises providing a plurality of program modules which can be run by a real-time operating system, the program modules being created using one or various programming languages. The method furthermore comprises initiating selected program modules by executing specifications in the description file using the control means.

The control means is preferably provided as part of the firmware of a controller, the controller in particular being designed as a control device for controlling an automation system. The controller is used for example for reading in sensor data and for controlling actuators on the basis of the sensor data. For this purpose, a control application is run on the controller. Running the control application, i.e. the overall application, comprises executing the plurality of program modules. The sequence control of the program modules is achieved by the controller which, for this purpose, initiates selected program modules by executing specifications in the description file.

Initiating a program module refers to executing or initiating the execution of a program module, the program module in particular being provided as a program code that is stored in a memory and can be executed by a real-time operating system. In order to initiate a program module, the control means preferably calls up a corresponding function of the operating system. The contents of the description file specify what program modules the control means initiates in what order and depending on what result, or in what time intervals. For this purpose, the description file for example comprises information relating to the identification of a program module, and associated information which for example specifies cyclical execution and an associated cycle time. Tasks to be assigned to program modules can advantageously also be defined in the description file.

The description file is provided in particular in a memory of a controller, in the form of a text file, and is read in by the control means, as part of the firmware of the controller, when the controller is started up or activated. The control means controls the sequence of the program modules specified in the description file by calling up corresponding operating system functions.

The control means may be configured as an execution and synchronization manager (ESM).

Using a control means of this kind allows for equal treatment and/or execution of programs from different program domains.

It is possible, for example, for program modules to be executed that are in each case programmed at least in one of the programming languages according to IEC Standard 61131, in Matlab/Simulink, C++, C #, or JAVA, or Python. Further programming languages are also possible. According to IEC Standard 61131 (Edition 3.0, 2013-02), two textual languages, specifically Instruction List (IL) and Structured Text (ST), and two graphical languages, specifically Ladder Diagram (LD) and Function Block Diagram (FBD) are specified. These programming languages can be applied together with high-level programming languages in sequence control.

The control means allows for simple configuration of tasks similar to IEC 61131-3, which configuration allows for the incorporation of program instances of different programming languages. For this purpose, the control means uses a series of operating system processors and threads in order to allow for performant integration in the underlying real-time operating system.

Accordingly, one programming language can be used for all the program modules. It is also possible for different programming languages to be used for two or more program modules.

When the program modules are initiated, the description file, which can also be referred to as the configuration file, is no longer addressed. Such addressing would take too much time and slow down the processing. Instead, when the system is started the configuration file(s) is/are read and then only run during the processing phase. In this case, execution of the information from the description file is provided by the control means. Specifications for executing the program modules thus result from the content of the description file. These specifications are provided by configuration of the description file. Consequently, the program modules are initiated by executing the configuration defined in the description file.

The configuration defined in the description file for example comprises an identifier for each of the selected program modules, for example a name under which the program module is saved, as well as associated information for executing the program module identified in each case, i.e. for example whether the program module is to be executed cyclically or in an event-controlled manner. The control means is designed to evaluate the information contained in the description file, and executes the selected program modules on the basis of the configuration information specified in the description file, the identification contained in the description file in each case being suitable for initiating, i.e. executing, the relevant program module using an operating system function.

The program modules are controlled for example using a programming interface, in particular an API (application programming interface). The description file, which may be provided for example as an XML (extensible markup language) file, is used for the configuration when the programs are addressed and thus run. Program modules can be executed and status information regarding the program sequence, e.g. task runtimes, can be recorded using the control means.

The control means can itself be initialized and controlled by a PLC (programmable logic controller) manager. Said manager for example sets the controller into RUN/STOP and performs reboots. During operation, the control means is initiated cyclically by events (software or hardware) in order to process an execution logic.

It is also possible for a plurality of description files or configuration files to be used for the sequence control. Further description files may contain a configuration of additional tasks and the associated program modules thereof. For example, a description file in the form of an XML file for example, may describe a main task (Task-Main), a further description file may describe a control task (Task-Ctrl) and a further description file may describe a synchronization task (Task-Sync). The configuration files can easily be combined into a configuration if no contradictions result therefrom. For this reason, the control means or a control means in the function of a master (ESM master) should recognize and read in all the configurations.

In a preferred embodiment, the method comprises repeated initiation of at least one of the program modules by the control means.

The description file does not need to be addressed for this purpose, and therefore processing times can be kept short. Further task types such as event and idle tasks can also be supported. The description file or the plurality of description files are advantageously read only for the purpose of the initial configuration, but not during the execution.

According to a further preferred embodiment of the method, the control means is designed to initiate at least some of the program modules such that said modules can be executed in various processes managed by the real-time operating system.

It is possible, in this manner, to use only the program modules that are required, and also to execute processes in parallel, in order to make efficient use of time resources.

According to a development of the method, the real-time operating system is designed to execute the processes and/or program modules on the basis of pre-determined priorities.

Setting priorities makes it possible for control tasks to be processed in accordance with the importance or urgency thereof.

Furthermore, in an embodiment of the method, recording and evaluation of the sequence control by the real-time operating system may be provided.

For the purpose of recording and evaluation, additionally inserted marking points may also be recorded, and statistics compiled.

In a further embodiment, the method may provide for expansion of the sequence control by means of an additional program module, without a control system being rebooted.

A control system denotes sequence control in which program modules can typically be uploaded, booted, debugged, stopped and downloaded. The control system is based on the real-time operating system.

It is advantageous for expansion of the control system to be possible, without the control system needing to be interrupted in order to be rebooted. In this manner, the operation can be continued uninterrupted.

In a further embodiment, the method may comprise splitting the sequence control over different processes.

A distribution of this kind can make better use of the advantages of different processes of the real-time operating system, e.g. memory protect mechanisms.

Furthermore, in a further embodiment of the method, generation of a statistical evaluation using profiling information may be provided.

In this case, marks or markings may be inserted into the control means in order to generate the profiling information. Profiling information is understood to be information for analyzing the runtime behavior of software. According thereto, statistical data can be evaluated for improving the sequence control and used for statistical purposes.

In a further embodiment, the method comprises inserting at least one recording marking into a program module for providing an application diagnosis.

A recording marking can be understood as a location in a program module which makes it possible to obtain information relating to the execution of a program module, over a specific portion of said program module. A diagnosis can subsequently be made on the basis of this information, in order to assess the application run. This may be a single application or the overall application of the control task.

In a further embodiment, the method comprises using the control means as a master and providing at least one further control means as a slave which is subordinate to the control means as the master.

The use of a slave can advantageously be applied when a program module is to be executed in a further process. If the entire application runs in a single process, a slave can be omitted.

Tasks are an organizational unit for the execution of programs. OS processes and OS threads (OS=operating system) can be used for the technical implementation of these organizational management units. In this case, it is desirable to allow for synchronized processing of tasks beyond OS process boundaries. The master is generally unable to create OS threads in other OS processes. For this reason, this task can be taken on by a slave in each of the OS processes involved. The master can take on the execution of the programs or program modules. If, in contrast, only one OS process is used, all the programs and threads can be executed without slaves.

The master and the slave can communicate for example via inter-process communication, if these are executed on the same device. The communication is advantageously implemented on the lowest plane, using basic functionalities of the operating system.

Furthermore, in a further preferred embodiment, the method may comprise assignment of individual tasks, of the tasks defined in the description file, to program modules, using the control means.

According thereto, the control means can distribute individual tasks within the control system in order to thus improve the utilization of the control system for example. A task or a plurality thereof may be a subset of a process within a control task.

The object of the present invention is furthermore achieved by a real-time operating system for sequence control of program modules, comprising a control means. In this case, the real-time system comprises a description file that is stored in a memory means and that defines a program sequence. Furthermore, a plurality of program modules that can be executed by the real-time operating system are provided, which program modules are created using one or different programming languages, the control means being designed to initiate the program modules by executing specifications of the description file.

The real-time operating system (RTOS) is an operating system that is capable of meeting real-time requirements of applications. In this case, it is particularly important to adhere to defined response times in the field of automation engineering, in order to prevent damage to an installed and controlled system.

The object of the present invention is achieved by a control means for sequence control of program modules, of one or different programming languages, in a real-time operating system. For this purpose, the control means is designed to perform the method according to the invention.

The control means may be designed in the form of an execution and synchronization manager (ESM). The control means may prioritize central tasks of the controller, distribute said tasks to available program modules, and receive information from the individual program modules and analyze said information.

The object of the present invention is furthermore achieved by a controller for sequence control of program modules of different programming languages, in a real-time operating system. For this purpose, the controller comprises a control means according to the invention, a processor, a memory, and at least one interface to an automation means.

In this case, a controller may be a control device that is installed in an automation system. In this case, the control means according to the invention is part of the controller according to the invention. Instantiating distribution or instantiation of the control means on a plurality of computer cores or cores of a multi-core processor is also possible.

Moreover, the object of the present invention is achieved by a computer program product. For this purpose, the computer program product comprises program code means for performing the method according to the invention, the computer program product being executed on a computer system, in a real-time operating system.

The computer program product may for example be a data medium that is provided in an automation system in order to perform the method according to the invention.

Overall, the control technology proposed offers a flexible solution which can be dynamically adapted to the future development in the field of automation engineering. Owing to the openness thereof, in contrast to previously closed systems, the control architecture proposed makes it possible to implement the desired applications in an entirely individual manner, and to nonetheless be on a stable base. This can be ensured not only for the target group of high-level language programmers, but also for previously installed automation systems within the context of IEC 61131-3 programming.

BRIEF DESCRIPTION OF THE DRAWINGS

Some embodiments of the invention are shown purely schematically in the drawings, and will be described in greater detail in the following. In the drawings.

DETAILED DESCRIPTION

Figure 1:
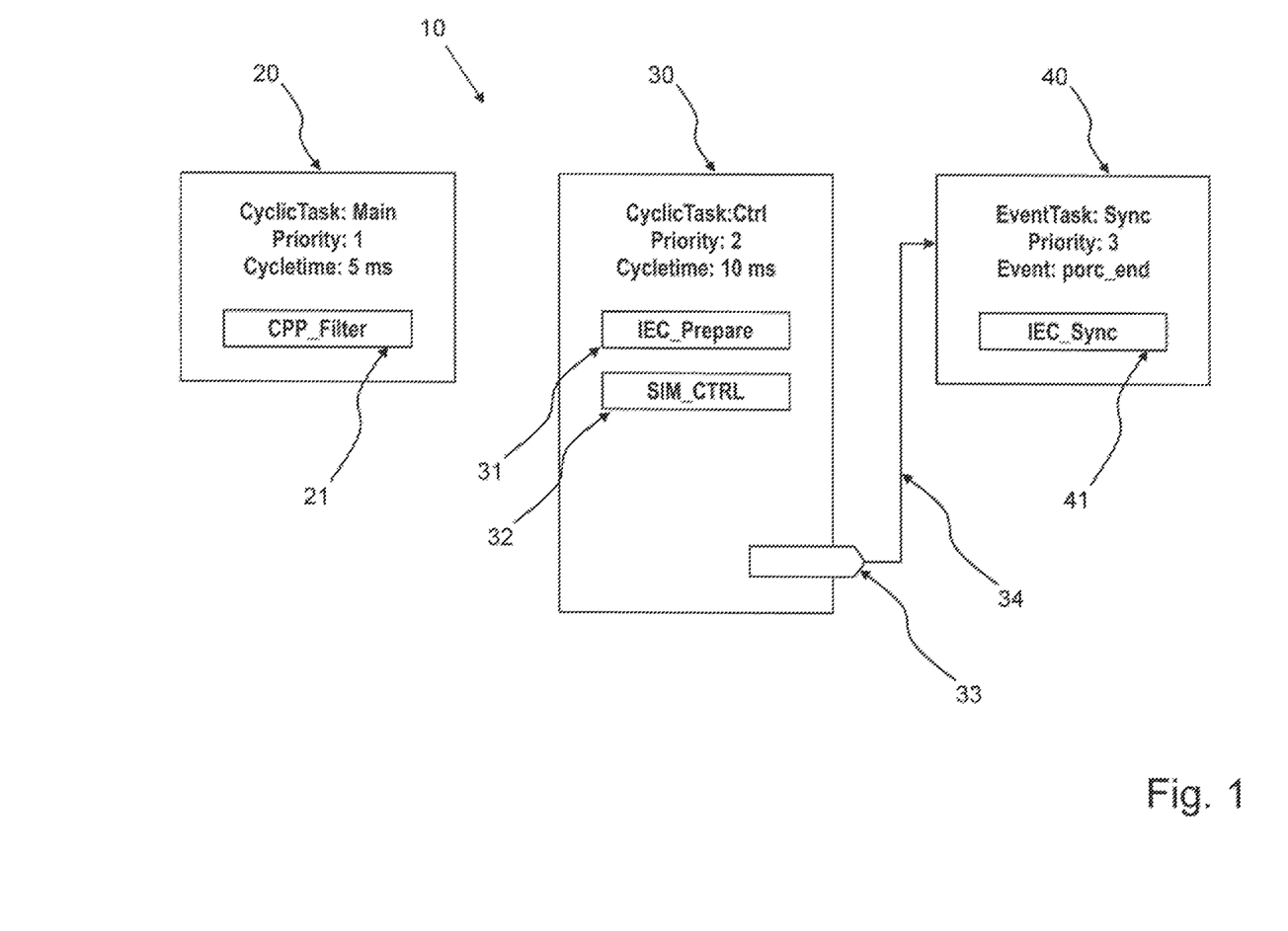
FIG. 1 illustrates an embodiment for controlling an overall application in an automation system according to the present invention.

FIG. 1 illustrates an embodiment for controlling an overall application 10 in an automation system according to the present invention.

In this connection, an overall application is understood to mean all programs or program modules, tasks and configuration settings which are required for execution on a control device. In this case, it is irrelevant whether the control device or the controller is the only one or is one of a plurality of devices.

Cyclical processing of programs or program modules is typical of automation. Feedback to the user is typically not provided within the context of these cycles.

FIG. 1 shows a schematic structure of three tasks 20, 30, 40, which overall synchronously execute four programs or program modules 21, 31, 32, 41 from the domains of IEC 61131-3, C++, and Matlab/Simulink. The program module 21 is a CPP filter and is programmed in the programming language C++. The program module 31 is an IEC prepare program and is programmed in one of the programming languages according to the IEC standardization. The program module 32 is a SIM-CTRL program, i.e. a control program, and is programmed in the programing language Matlab/Simulink. The program module 41 is an IEC-Sync program, i.e. a synchronization program, and is programmed in one of the programming languages according to the IEC standardization. In this context, the terms "program" and "program module" are used interchangeable.

After the procedure end or the process end of the program module 30, the program module 41 initiates the start of the task 40, via an interface 33, by way of a communications link 34.

The tasks 20, 30, 40 of FIG. 1 have different priorities for the execution of the overall application 10, the task 20, as the main task, having the lowest priority, the task 30, as the control task or Ctrl-Task, having a medium priority, and the task 40, as the event task having synchronization tasks, having the highest priority. The task 20 furthermore has a cycle time of 5 ms (ms=milliseconds), and the task 30 has a cycle time of 30 ms. The task 40 is executed once, and ends when the program module 41 or the program in the program module has bene processed (event: proc_end).

Figure 2:
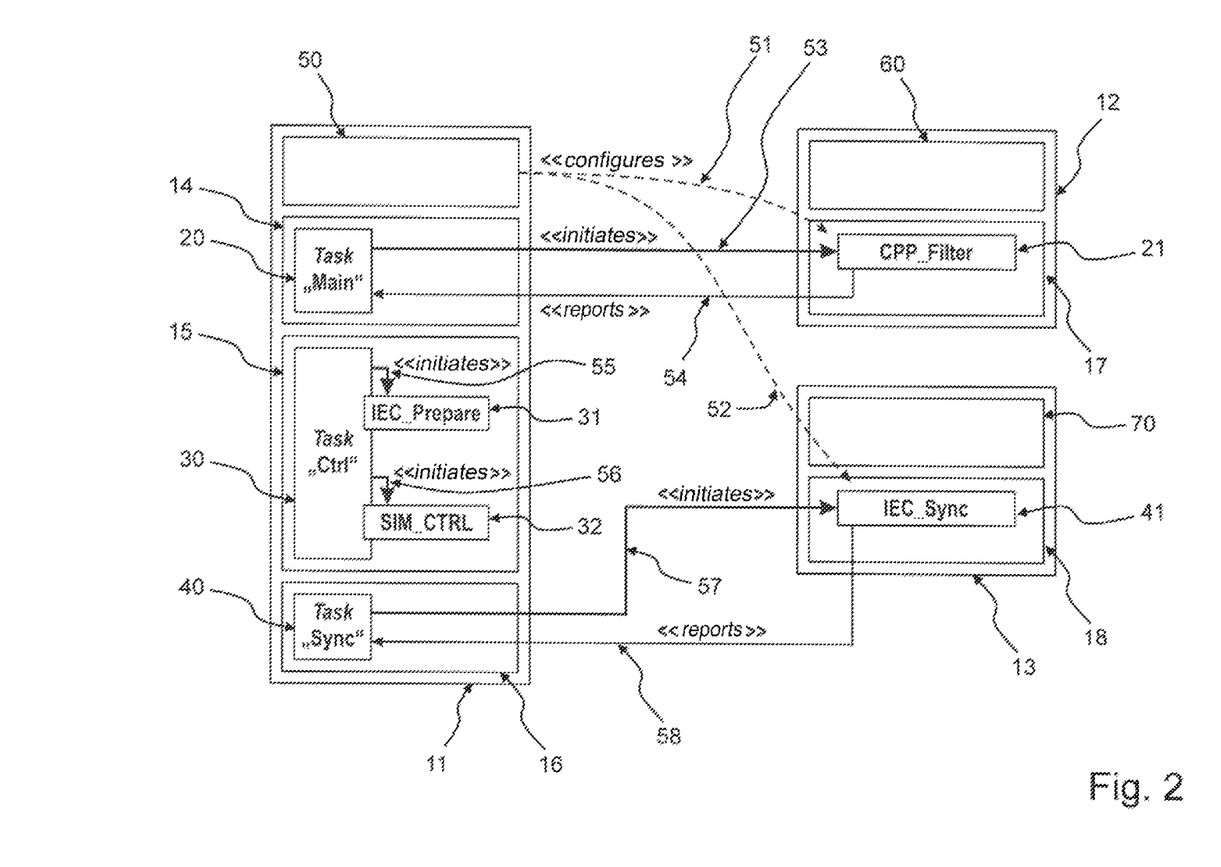
FIG. 2 illustrates an embodiment, according to the present invention, of a schematic structure comprising the control means as the master and two further control means as slaves.

FIG. 2 illustrates an embodiment, according to the present invention, of a schematic structure comprising a control means 50 as the master, a control means 60 subordinate to the master as the first slave, and a further control means 70 subordinate to the master as the second slave. In this case, the master components and slave components 50, 60, 70 are used in order to coordinate program modules, from different program domains, in different processes. FIG. 2 furthermore shows different operating system processes or OS processes 11, 12, 13 which each comprise OS threads 14, 15, 16, 17, 18.

The procedure according to the invention makes it possible to compose heterogeneous task contents. In this case, the processing sequence within a task can be selected freely and is not specified in a manner dependent on the system, and consistent data exchange between program instances is possible.

The configuration of the master 50 and the tasks 20, 30, 40 thereof is achieved by one or more description files, in this case in the form of one or more XML files, which allow for configuration instead of programming. As a result, the function of a system can be changed at the runtime, without the individual application portions having to be translated again. The description file or the XML-based configuration also allows the user to make adjustments directly on the controller, or to use independent external tools and tool chains.

The structure of the description file, in particular in the form of an XML file, can in this case be specified by clearly defined schema files, allowing for quick checking of the configuration. The specification of tasks and the associated program instances in a plurality of description files or XML configuration files makes it possible to split the overall application 10 into functional modules which can be created by different developer groups or suppliers. This facilitates not only the development of a complex sequence control system, but also the step-wise expansion of a running system. As a result, it is not necessary for the overall application 10 to be available from the beginning, but said application can instead be composed of partial modules.

In addition, the definition of parameters in the description file or XML file allows for each task 20, 30, 40 to be assigned to a processor core, a group, or to all processor cores of the controller.

A flexible system consisting of master and slave components 50, 60, 70 furthermore allows the user to execute programs over process boundaries. This is an advantageous prerequisite for separating programs of different users, which programs are thus executed in encapsulated memory regions. The memory protect mechanisms of the underlying real-time operating system can be used as the basis for this. For security reasons, it is therefore possible to restrict the access of programs or program modules in accordance with the user rights.

In FIG. 2, the master 50 in each case configures one program module 21, 41 of a slave 60, 70 via operative connections 51, 52. In this case, "configuration" relates to the provision of priority information by the master 50. Furthermore, communications links 53, 54, 57, 58 are present in FIG. 2 in order to exchange commands and information or feedback among the individual program modules 21, 31, 32, 41 and a task 20, 30, 40. In this case, the information is sent back and forth and/or received in each case between master and slave instances. Commands are for example initiation commands ("initiates") of the task 20, 40 to the program module 21, 41. Feedback is sent for example from the program modules 21, 41 to the tasks 20, 40 ("reports"). Furthermore, initiation commands ("initiates") are also in each case sent from the task 30 to the program modules 31, 32 via the communications links 55, 56, the communication taking place within an OS thread.

The proposed procedure makes it possible to transfer the known tasks from the IEC standardization into the field of high-level languages. As a result, the control means supports current cyclical tasks, idle tasks and event-based tasks which are represented on the priority-controlled processes and threads of the real-time operating system. In addition to said priority-controlled execution, the control means also makes it possible to execute tasks in response to the occurrence of a special event. This freely configurable system therefore makes it possible to mix program instances of different program domains within one task, and to execute said instances together. As a result, the sequence models known from IEC 61131-3 are also opened up for other domains.

However, the degrees of freedom offered by the task execution using the control means 50 also increase the complexity during configuration and analysis. The control means 50 therefore provides integrated mechanisms for detailed profiling based on available expansion of the real-time operating system. The user is thus provided with the possibility of observing, evaluating and recording different properties of the task execution and of the operating system. These properties include, inter alia, the execution times of the tasks and program instances, frequency of task replacements, latency and jitter, system utilization, or watchdog monitoring. This information can also be evaluated, using dynamic ring buffers, for post mortem analyses following an error.

Furthermore, centrally storing the profiling information of the control means 50 allows for statistical evaluations to be performed without said data being available for further analyses by remote server systems.

Figure 3:
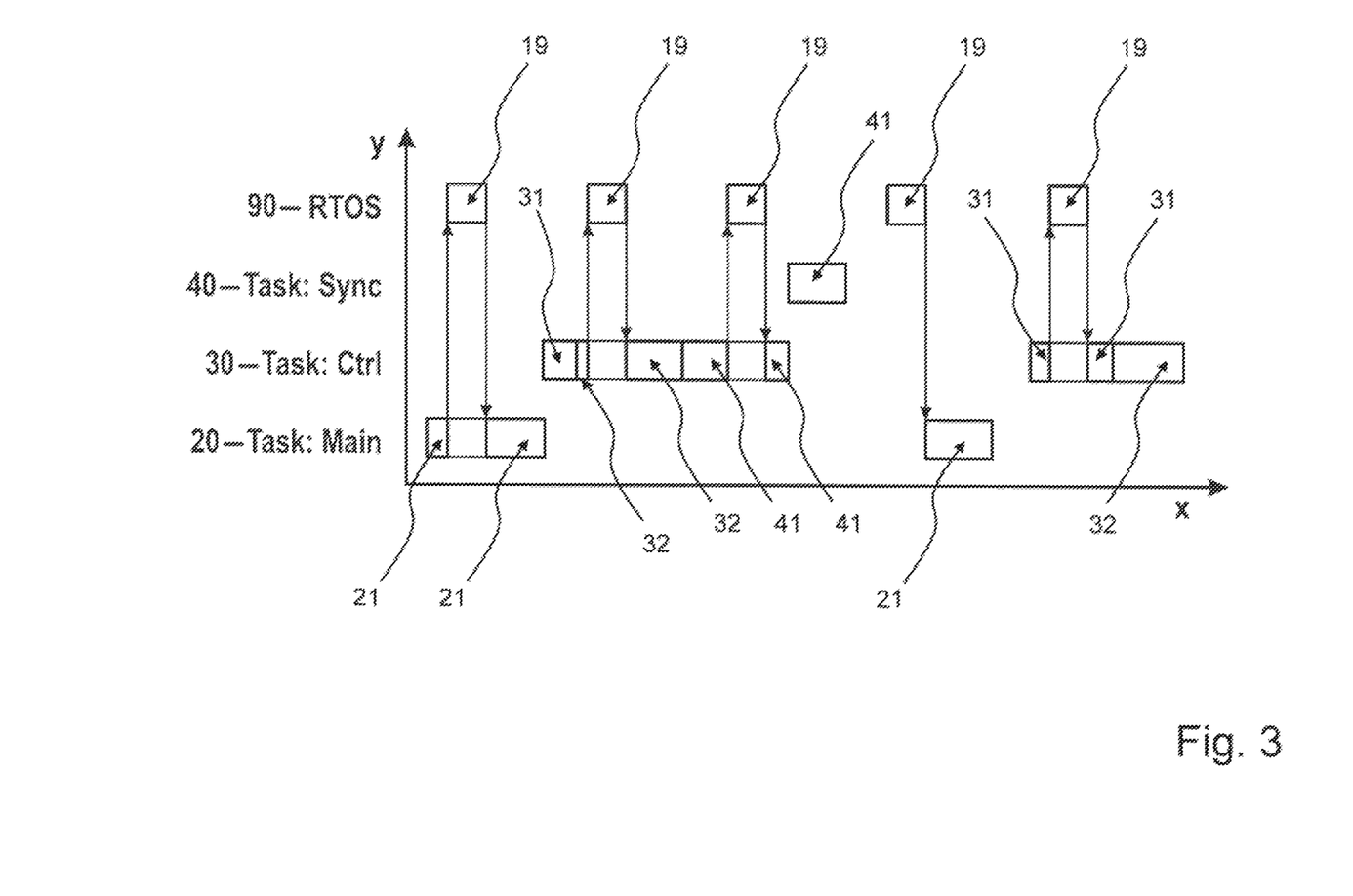
FIG. 3 illustrates an embodiment, according to the present invention, of controlling a program sequence using a control means.

FIG. 3 illustrates an embodiment, according to the present invention, of controlling a program sequence using a control means 50. In order to perform an automation task, the control means 50 can also access all auxiliary instances, such as one slave or a plurality of slaves, as shown in FIG. 2.

FIG. 3 illustrates, in a simplified manner, coordination or control of control tasks by a control means 50, as is shown for example in FIG. 2. In this case, the described tasks 20, 30, 40 of FIG. 1 are controlled by the control means 50. In the case of this control or the evaluation thereof, it is possible to clearly trace when the individual programs and tasks are replaced by higher-level processes. These higher-level processes are reserved for the operating system and are shown in FIG. 3 ad OS processes 19.

FIG. 3 shows the time on the x-axis, and processes or priority of the process on the y-axis. Therefore, as already explained with reference to FIG. 1, the task 20 has the lowest priority and the task 40 has the highest priority. RTOS denotes a high-priority thread 90 of the real-time operating system (RTOS), which thread has the highest priority. The high-priority thread 90 or high-priority OS thread 90 is, accordingly, part of the real-time operating system.

As a result, the first task 20 is executed first, in time, by the program module 21, but this is interrupted by a real-time process 19 of the operating system. Subsequently, task 30 is processed by program modules 31 and 32. Thereafter, task 40 is processed by the program module 41. Here, too, there are temporary interruptions of the program modules by real-time processes 19. After the higher priorities have been processed, task 20 begins again, and thereafter task 30 is executed, and therefore FIG. 3 indicates cyclical processing of the tasks.

Overall, according to the invention, a functionality is made possible, as a component of a new firmware architecture, on the basis of which functionality new industrial controls are implemented. This architecture is initially implemented for use on a device or control device. The architecture is designed, however, such that expansion to a plurality of devices is possible. This is the case for example in a redundancy system, in which two controls are executed synchronously.

The aim in this case is to support the supplementation of conventional programming of controllers by high-level languages. For this purpose, a smooth transition between the IEC 61131-3 and the field of high-level languages is sought. A prerequisite for this, in addition to the support of languages of this kind, is also the seamless integration of the different programming domains. These include, inter alia, Matlab/Simulink, C++, C #, JAVA, Python and the languages of IEC 61131-3. In order to achieve a seamless integration of this kind, the control system should be capable of transferring the sequence known from IEC 61131-3, comprising program instances and tasks, into the sequence of other programming domains. Despite these more complex requirements of the technical implementation, aspects of data security, usability, flexibility and above all performance, are in addition ensured.

Figure 4:
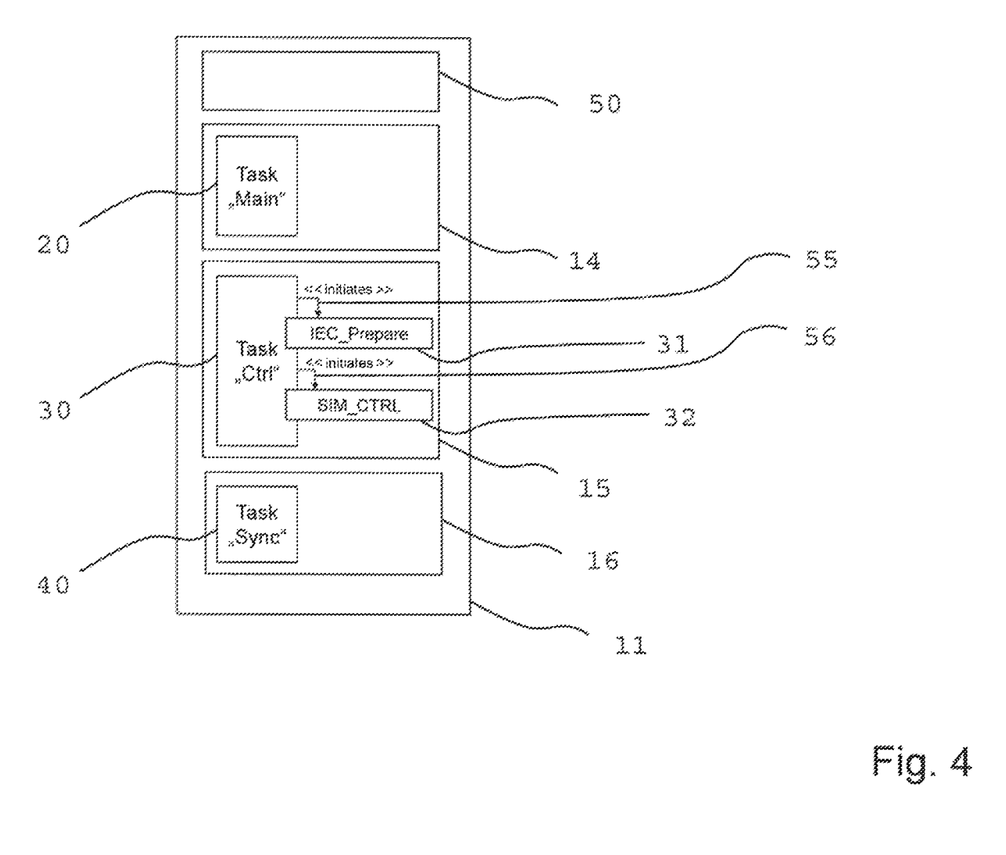
FIG. 4 illustrates an embodiment, according to the present invention, of a schematic structure comprising a control means.

FIG. 4 illustrates an embodiment, according to the present invention, of a schematic structure comprising a control means 50. In this embodiment, an operating system process or OS process 11 is shown, which comprises OS threads 14, 15, 16.

The procedure according to the invention makes it possible to compose heterogeneous task contents. In this case, the processing sequence within a task can be selected freely and is not specified in a manner dependent on the system, and consistent data exchange between program instances is possible.

The configuration of the master 50 and the tasks 20, 30, 40 thereof is achieved by one or more description files, in this case in the form of one or more XML files, which allow for configuration instead of programming. As a result, the function of a system can be changed at the runtime, without the individual application portions having to be translated again. The description file or the XML-based configuration also allows the user to make adjustments directly on the controller, or to use independent external tools and tool chains.

The structure of the description file, in particular in the form of an XML file, can in this case be specified by clearly defined schema files, allowing for quick checking of the configuration. The specification of tasks and the associated program instances in a plurality of description files or XML configuration files makes it possible to split the overall application 10 into functional modules which can be created by different developer groups or suppliers. This facilitates not only the development of a complex sequence control system, but also the step-wise expansion of a running system. As a result, it is not necessary for the overall application 10 to be available from the beginning, but said application can instead be composed of partial modules.

In addition, the definition of parameters in the description file or XML file allows for each task 20, 30, 40 to be assigned to a processor core, a group, or to all processor cores of the controller. The task 30 in each case sends initiation commands ("initiate") to the program modules 31, 32 via the communications links 55, 56, the communication taking place within an OS thread.

The embodiment shown in FIG. 4 advantageously allows for the execution of the program modules in one single common OC process, it being possible for the program modules to be created using different programming languages.

The advantages and designs set out above, in connection with the embodiment shown in FIG. 2, apart from those relating to the master/slave aspects, also apply to the embodiment shown in FIG. 4.

A possible content of a description file in XML format is set out below, by way of example:

```
<?xml version="1.0" encoding="UTF-8"?>
<EsmConfigurationDocument>
<EsmComponentSettings>
<SharedDataSettings Size="1024" />
</EsmComponentSettings>
<EsmList>
<Esm Name="ESM0" CpuAffinity="0" TimerInterval="500us" TaskScheduleMode="IntervalCounting" />
<Esm Name="ESMI" CpuAffinity="1" TimerInterval="100us" TaskSchedulerMode="SystemClock"/>
</EsmList>
<Tasks>
<Task Name="TaskCount" CycleTime="500us" TaskType="Cyclic" TaskPriority="4" />
<Task Name="TaskConf" CycleTime="250ms" TaskType="Cyclic" TaskPriority="5" />
<Task Name="TaskMain" CycleTime="10ms" TaskType="Cyclic" TaskPriority="7" />
</Tasks>
<EsmTaskRelations>
<EsmTaskRelation ESMName="ESM0' TaskName="TaskCount" />
<EsmTaskRelation ESMName="ESM0' TaskName="TaskConf" />
<EsmTaskRelation ESMName="ESMI' TaskName="TaskMain"/>
</EsmTaskRelations>
<Programs>
<Program Name="CppCounter-1" ProgramType="CppCounter" ComponentName="Arp.Demonstrator.CppCounter-1" />
<Program Name="CppConfig-1" ProgramType="CppConfig" ComponentName="Arp.Demonstrator.CppConfig-1" />
<Program Name="PizController-I' ProgramType="PizController' ComponentName="Arp.Demonstrator.PizController-1" />
<Program Name="SimHeli-I" ProgramType="SimHeli" ComponentName="Arp.Demonstrator.SimHeli-1" />
</Programs>
<TaskProgramRelations>
<TaskProgramRelation TaskName="TaskCount" ProgramName="Arp.Demonstrator.CppCounter-1/CppCounter-1" Order="0" />
<TaskProgramRelation TaskName="TaskConf" ProgramName="Arp.Demonstrator.CppConfig-I/CppConfig-1" Order="0" />
<TaskProgramRelation TaskName="TaskMain" ProgramName="Arp.Demonstrator.PizController-I/PizController-1" Order="0" />
<TaskProgramRelation TaskName="TaskMain" ProgramName="Arp.Demonstrator.SimHeli-1.SimHeli-1" Order="1" />
</TaskProgramRelations>
</EsmConfigurationDocument>
```

LIST OF REFERENCE SIGNS

10 overall application
11 OS process

12 OS process
13 OS process
14 OS thread
15 OS thread
16 OS thread
17 OS thread
18 OS thread
19 OS process
20 task
21 program module
30 task
31 program module
32 program module
33 procedure end
34 communications interface
40 task
41 program module
50 control means or ESM
51 operative connection
52 operative connection
53 communications link
54 communications link
55 communications link
56 communications link
57 communications link
58 communications link
60 control means or ESM as first slave
70 control means or ESM as second slave
80 OS process
90 high-priority OS thread

The invention claimed is:

1. A method for sequence control of program modules, wherein the program modules are executed by a control device as part of a control application run by the control device for controlling an automation system, said method comprising:
providing a control means as a part of a firmware of the control device;
providing a description file comprising a configuration for controlling a program sequence, the configuration comprising, for each of the program modules selected for execution, an identifier and associated information for executing the program module;
providing a plurality of program modules which can be executed by a real-time operating system, wherein the program modules are created using one or different programming languages;
evaluating the information contained in the description file by the control means; and
initiating selected program modules by the control means on the basis of the configuration information specified in the description file.

2. The method according to claim 1, further comprising repeated initiation of at least one of the program modules by the control means.

3. The method according to claim 1, wherein the control means is designed to initiate at least some of the program modules such that said modules can be executed in different processes managed by the real-time operating system.

4. The method according to claim 3, wherein the real-time operating system is designed to execute the processes and/or process modules on the basis of pre-determined priorities.

5. The method according to claim 4, further comprising recording and evaluating the sequence control using the real-time operating system.

6. The method according to claim 1, further comprising changing the sequence control by adding or removing program modules, without a reboot of a control system being performed.

7. The method according to claim 1, further comprising dividing the sequence control over different processes.

8. The method according to claim 1, further comprising generating a statistical evaluation using profiling information.

9. The method according to claim 1, further comprising inserting at least one recording marking into a program module for providing an application diagnosis.

10. The method according to claim 1, further comprising using the control means as a master and providing at least one further control means as a slave which is subordinate to the control means as the master.

11. The method according to claim 1, further comprising assigning, by the control means, of individual tasks described in the description file to program modules.

12. A real-time operating system for sequence control of program modules, wherein the program modules are executed by a control device as part of a control application run by the control device for controlling an automation system, said real-time operating system comprising:
a control means provided as a part of a firmware of the control device;
a description file that is stored in a memory and comprises a configuration for controlling a program sequence, said configuration comprising, for each of the program modules selected for execution, an identifier and associated information for executing the program module;
a plurality of program modules that can be executed by the real-time operating system and are created using one or different programming languages;
wherein the control means is designed to evaluate the information contained in the description file and to initiate the program modules on the basis of the configuration information specified in the description file.

13. A control means for sequence control of program modules of one or different programming languages in a real-time operating system designed for performing the method according to claim 1, wherein the program modules are executable by a control device as part of a control application run by the control device for controlling an automation system, and wherein the control means is provided as part of a firmware of the control device.

14. A control device for controlling an automation system, said control device being adapted for sequence control of program modules of one or different programming languages in a real-time operating system, comprising:
a control means according to claim 13;
a processor;
a memory; and
at least one interface to a sensor or to an actuator of the automation system.

15. A computer program product comprising program code for performing the method according to claim 1, wherein the computer program product is executed on a computer system, in a real-time operating system.

* * * * *